Figure 1:
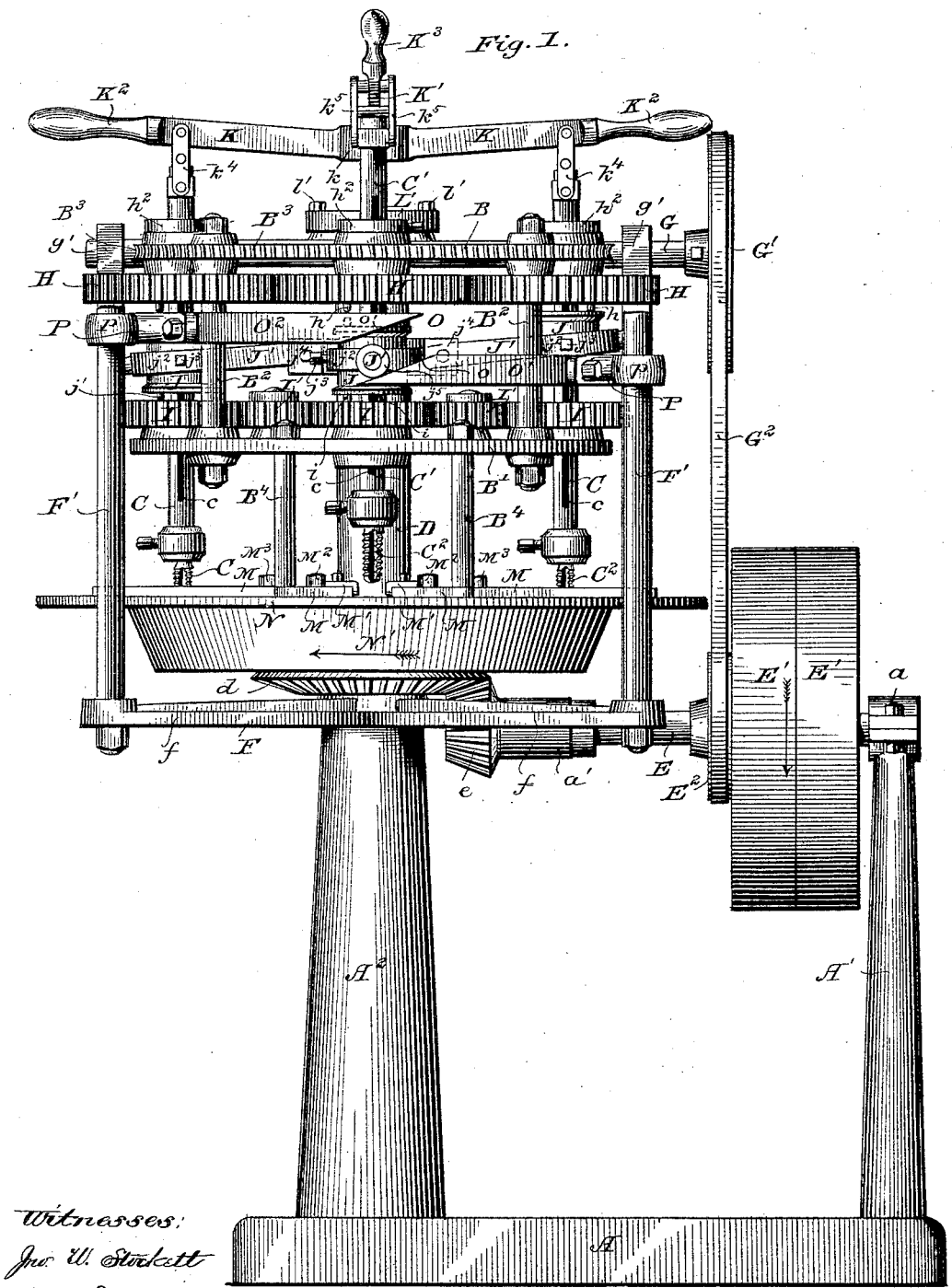

(No Model.) 4 Sheets—Sheet 2.

C. G. CROSS.
NUT TAPPING MACHINE.

No. 327,533. Patented Oct. 6, 1885.

Witnesses:
Jno. W. Stickell
C. C. Poole

Inventor.
Christopher G. Cross.
by M. E. Dayton
Attorney

N. PETERS, Photo-Lithographer, Washington, D. C.

(No Model.) 4 Sheets—Sheet 3.
C. G. CROSS.
NUT TAPPING MACHINE.

No. 327,533. Patented Oct. 6, 1885.

Witnesses:
Jno. W. Stockett.
C. C. Poole

Inventor.
Christopher G. Cross.
by M. E. Dayton
Attorney (No Model.)

4 Sheets—Sheet 4.

C. G. CROSS.
NUT TAPPING MACHINE.

No. 327,533.

Patented Oct. 6, 1885.

Witnesses:
Jno. W. Stockett.
C. C. Poole

Inventor
Christopher G. Cross.
by M. E. Dayton
Attorney

UNITED STATES PATENT OFFICE.

UNITED STATES PATENT OFFICE.

CHRISTOPHER G. CROSS, OF CHICAGO, ILLINOIS, ASSIGNOR TO WILLIAM H. BANKS AND ORLANDO P. BRIGGS, BOTH OF SAME PLACE.

NUT-TAPPING MACHINE.

SPECIFICATION forming part of Letters Patent No. 327,533, dated October 6, 1885.

Application filed December 26, 1883. Serial No. 115,537. (No model.)

*To all whom it may concern:*

Be it known that I, CHRISTOPHER G. CROSS, of Chicago, in the county of Cook and State of Illinois, have invented certain new and useful Improvements in Nut-Tapping Machines; and I do hereby declare that the following is a full, clear, and exact description thereof, reference being had to the accompanying drawings, and to the letters of reference marked thereon, which form a part of this specification.

The object of this invention is to provide an improved construction in nut-tapping machines; and it consists in the matters hereinafter described, and pointed out in the claims.

In a machine embodying my invention two longitudinally-movable tap-spindles are used, which are so constructed that the movement of the spindle supporting one tap occasioned by the rotation of the tap in withdrawing it from a tapped blank will cause the desired forward movement of the other spindle necessary to cause the tap thereon to enter the untapped blank, the two spindles being connected in such manner that the longitudinal movement of either spindle in one direction will produce a corresponding movement of the other spindle in the opposite direction, said spindles being preferably operated by suitable gearing, so constructed that their direction of rotation will be changed as required after tapping the blanks to withdraw the taps therefrom. For the purpose of producing the opposite simultaneous longitudinal movements of the spindles one from the other, said spindles are connected, preferably, by a transverse lever pivoted centrally to a suitable stationary support, suitable means being provided, in connection with the spindles described, for supporting the nuts immovably in position to be operated upon.

In a machine embodying only the elements above described the nuts are fed to each spindle separately and in alternation, and it is necessary in the use of such machine to employ two separate feeding devices, or two attendants in case the nuts are fed by hand. In order to allow the nuts to be fed to the taps at one point, and also to produce a machine capable of more rapid work, the principles of construction above set forth are herein shown as embodied in a many-spindled tapping-machine of that class in which the spindles are supported upon a revolving frame or reel, in which the tap spindles are rotated for the purpose of operating upon the blanks during their revolution about the center of the reel. In this machine the tap-spindles are arranged in pairs upon the opposite sides of the axis of the reel, and are connected by transverse levers pivoted to a central shaft or support. Any desired number or pairs of tap-spindles may be used, but two being shown in the machine herein illustrated. Suitable devices are provided for automatically reversing the direction of rotation of the spindles at desired intervals, as hereinafter more particularly described.

Figure 2:
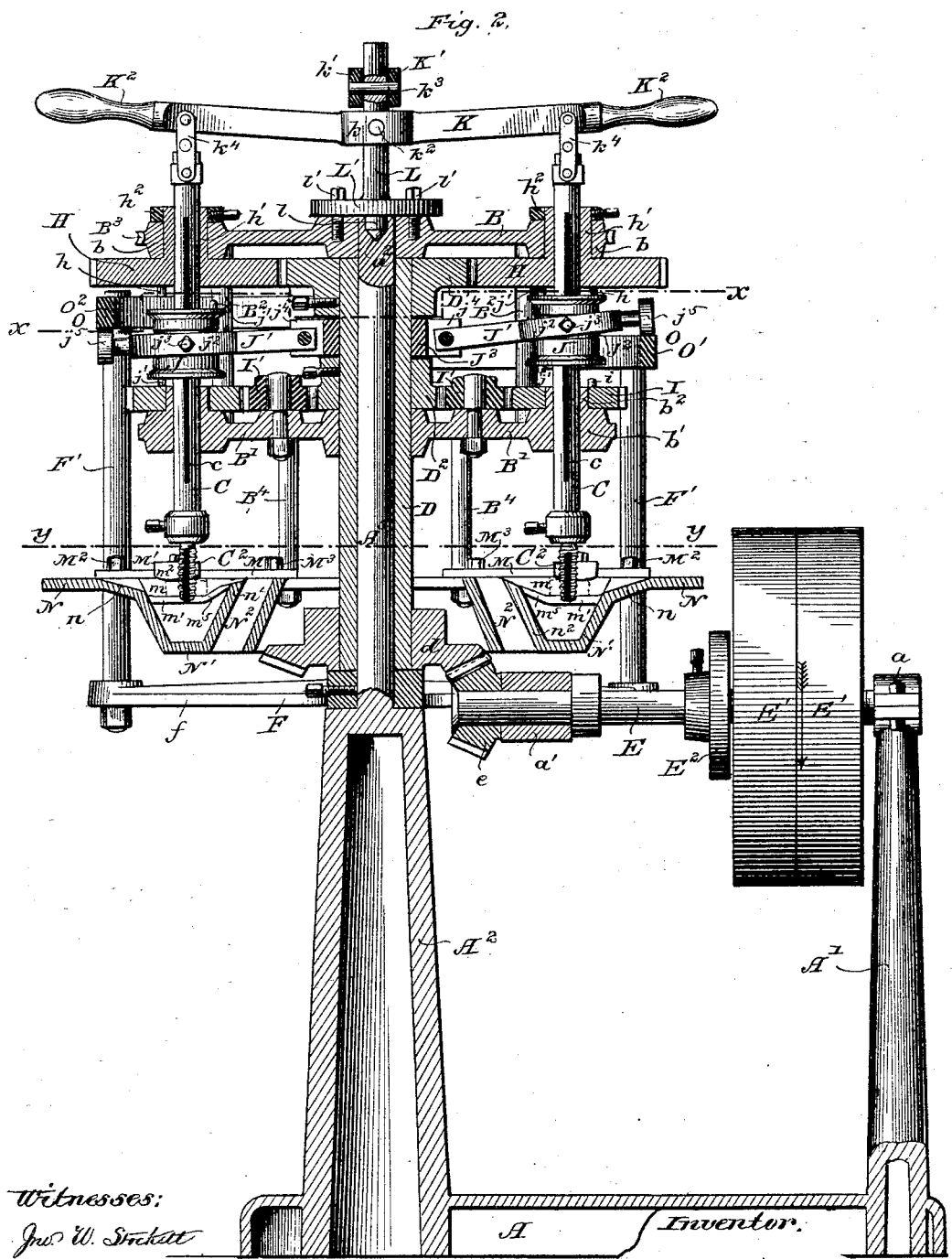
Figure 3:
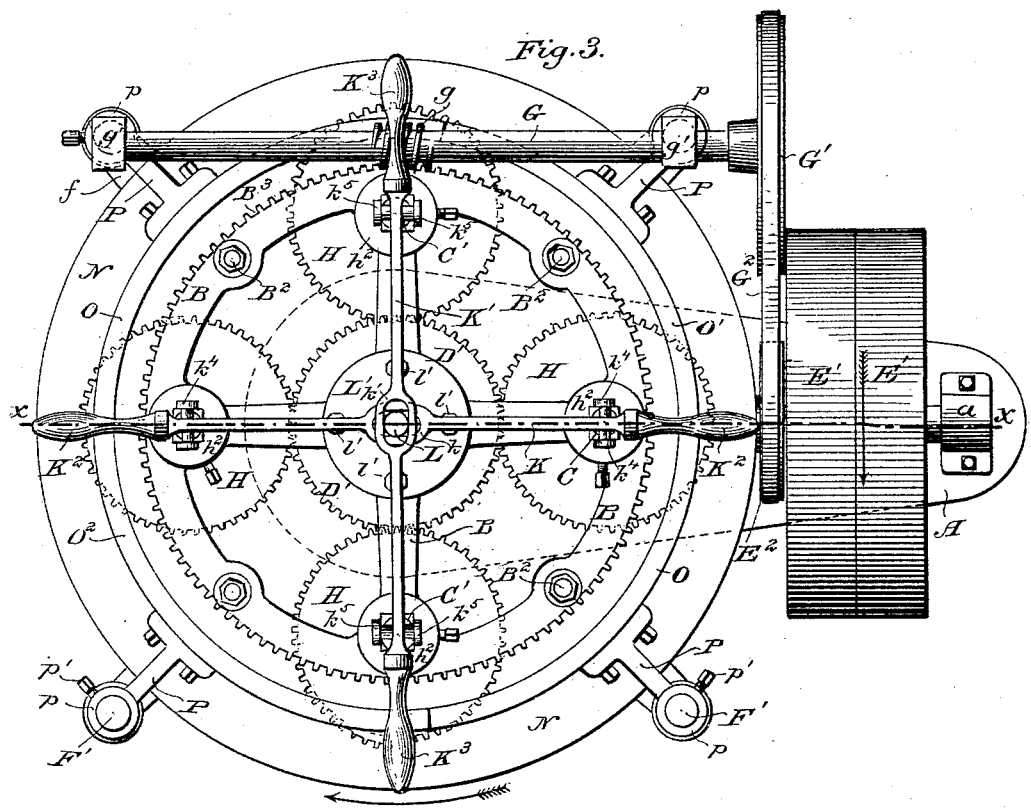
Figure 4:
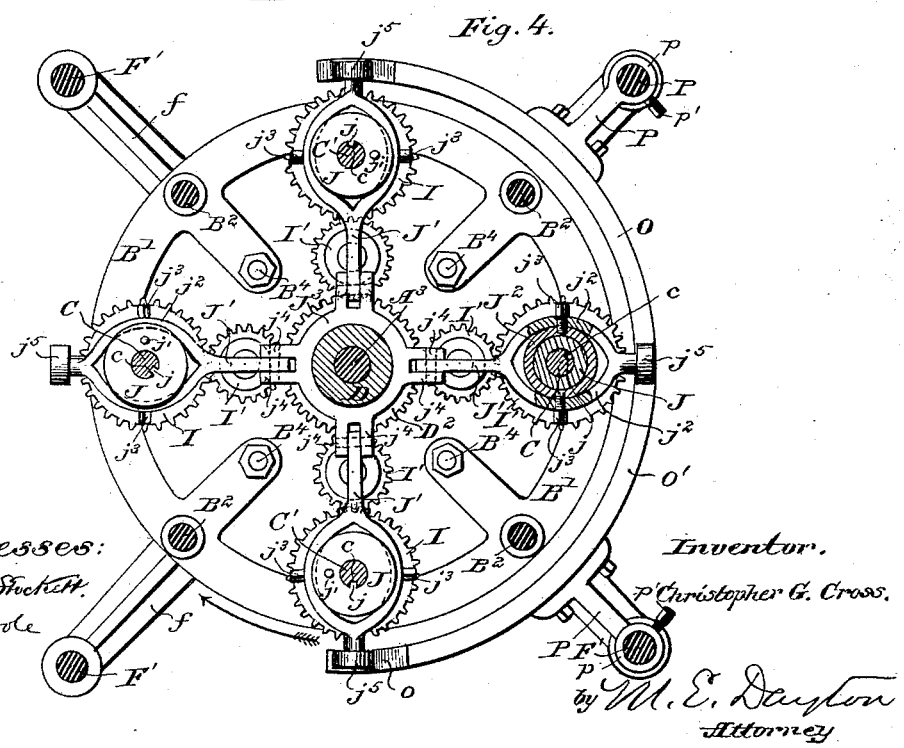
Figure 5:
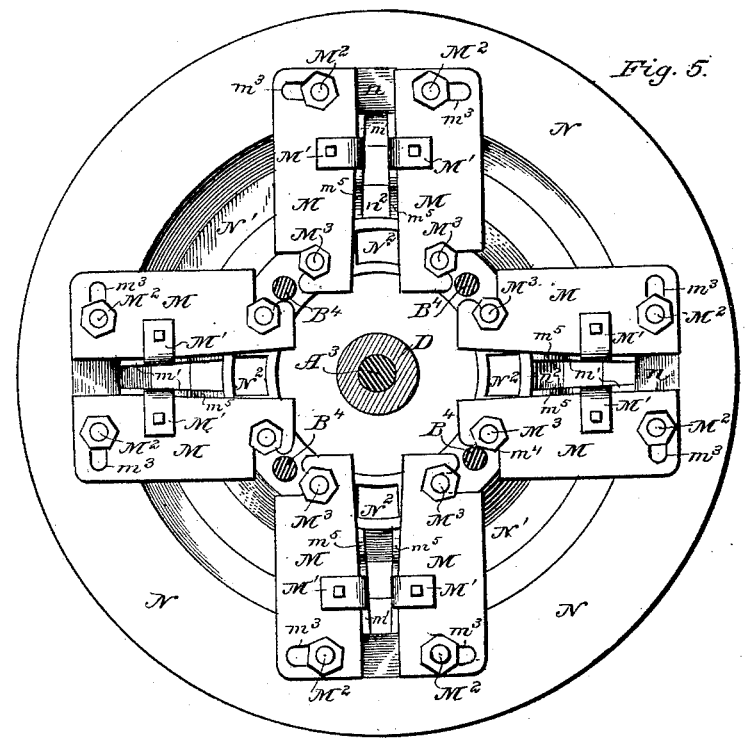
Figure 6:
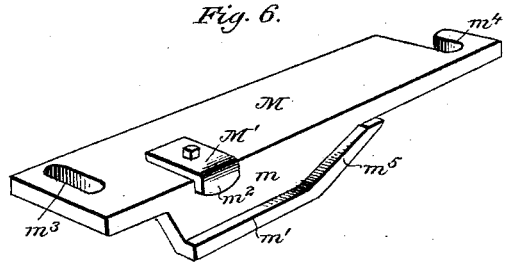

In the accompanying drawings, Figure 1 is a side elevation of a machine embodying one form of my invention. Fig. 2 is a central vertical section thereof, taken upon line *x x* of Fig. 3. Fig. 3 is a plan or top view of the machine. Fig. 4 is a horizontal section taken upon line *x x* of Fig. 2. Fig. 5 is a section taken upon line *y y* of Fig. 2. Fig. 6 is a detail perspective view of one of the plates forming the blank-guides.

The main frame of the machine, upon which the several operative parts are supported, consists, as herein shown, of a bed-plate, A, having two standards or posts, A' and A², thereon. The main or principal part of the machine is supported upon the post A², which is provided at its upper end with the vertical shaft A³, affording a central bearing for two annular castings or disks, B and B', which, together with the parts joining them, form a reel or frame in which two opposite pairs of tap-spindles, C C', are vertically supported. The shaft A³ also serves as a bearing for a sleeve, D, from which the devices for rotating the tap spindles are actuated, said sleeve being operated by means of a driving-shaft, E, supported at one end in a bearing, *a*, upon the post A', and at its inner end in a bearing, *a'*, upon the arm *f* of a stationary casting, F, which is secured to the upper end of the standard A², for a purpose hereinafter described. The shaft E is provided with suitable driving-pulleys, E', and has upon its inner end, adjacent to the sleeve D, a beveled pinion, $e$, engaged with a corresponding bevel-gear, $d$, upon the lower end of said sleeve.

The parts B and B' of the reel or frame, in which the several tap-spindles are mounted, are, as herein shown, vertically separated, and the upper part, B, is constructed to rotate upon the upper end of the spindle $A^3$ above the sleeve D, and the lower one, B', is located at some distance below the part B, and is constructed to rotate freely upon the said sleeve. The parts B and B' of the reel are rigidly connected by means of vertical posts or studs $B^2$, (shown more clearly in Figs. 1 and 4,) and motion is given to the entire reel structure by the action of a worm, $g$, upon a horizontal shaft, G, which engages the circular toothed periphery $B^3$ of the upper plate, B. The shaft G has bearings in boxes $g'$ upon the upper end of standards F', which are extended downwardly and attached to the stationary casting F, before referred to. The shaft G is preferably operated from the shaft E of the machine, and the driving connections between them may be constructed in any desired or preferred manner. As shown in the accompanying drawings, the shaft G is provided with a pulley, G', located in the same plane with a pulley, $E^2$, upon the driving-shaft E, a suitable driving-belt, $G^2$, being placed over the pulleys G' and $E^2$, as shown.

For the purpose of causing the desired rotation of the tap-spindles C and C' necessary for the operation of the taps, the rotating sleeve D is provided with two gear-wheels, D' and $D^2$, the wheel D' being secured to the said sleeve near its upper end adjacent to the disk B and meshing with a series of gear-wheels, H, mounted loosely upon the disk B concentric with the spindles. The gear-wheel $D^2$ is secured to the said sleeve at some distance below the gear-wheel D' and above the disk B', said gear $D^2$ being constructed to operate a series of gears, I, mounted loosely upon the said disk B', concentric with the tap-spindles, through the medium of idlers I', pivoted to the disk, so as to rotate said wheels I in a direction opposite to the direction of rotation of the wheels H.

Upon the tap-spindles C C', between the wheels H and I, are placed clutch devices constructed to cause the engagement of the said spindles with either of the wheels H or I, as desired. Said clutch devices, as herein shown, and as preferably constructed, consist of sleeves J, which are constructed to slide longitudinally upon the tap-spindles, and have projections or splines $j$ upon their inner cylindrical surfaces, engaged with corresponding longitudinal grooves $c$ in the said spindles. The sleeves J are provided at their upper and lower ends with projections $j'$, constructed to engage corresponding projections, $h$ and $i$, upon the wheels H and I, so that when said sleeves are moved longitudinally upon the spindles the projections upon the sleeves will engage with the projections upon the wheels H or I, and the rotary movement of the engaged wheels will be transmitted to the spindles through said sleeves. The sleeves J are preferably operated by means of a series of radially-arranged levers, J', pivotally connected with said sleeves by means of rings $J^2$, engaged with annular grooves in the sleeves and connected with the laterally-divided parts $j^2$ of the levers J' by means of pivot-bolts $j^3$.

The inner ends of the levers J' are pivoted to a ring, $J^3$, which encircles the sleeve D, and is held from vertical movement thereon by contact with the hubs of the gear-wheels D' and $D^2$, said ring $J^3$ being provided with projections or lugs $j^4$, (shown more clearly in Fig. 4,) between which the inner ends of the levers J' are placed. The ring $J^3$ is caused to revolve with the reel and the several spindles therein, said ring being carried around by means of the levers J', which, as hereinafter stated, are connected with the spindles through the medium of the sleeves J upon the latter.

The said levers J' may be operated by hand, so as to cause the requisite change in the direction of motion of the spindles; but means are preferably provided in the machine herein illustrated for operating the clutches automatically at desired times, as will be hereinafter more particularly described.

The opposite pairs of spindles C and C' are connected at their upper ends by means of horizontally-arranged levers K and K', pivotally connected with a central post, L, which is attached to and moves with the reel. As herein illustrated, the lever K is located slightly below the lever K', and the said levers are pivotally connected with the post L by having their central portions formed in open rings $k$ and $k'$, which encircle the said post, suitable pivot-pins, $k^2$ and $k^3$, being inserted through the said parts $k$ and $k'$ and the said post, as shown.

As a preferred construction in the means for connecting the post L with the disk B, the said post is attached at its lower end to a disk or flange, L', which is provided with a short downwardly-projecting center pin, $l$, adapted to enter a corresponding recess, $a^2$, in the flat upper surface of the central stationary spindle $A^3$, so as to support the weight of the reel with a minimum of friction in the bearing-surfaces. The disk L' is extended beyond the exterior margin of the spindle $A^3$ and over the adjacent parts of the disk B, and is secured to said disk by means of bolts $l'$ passing through the disk L' and into the disk B. The outer ends of the levers K and K' are pivotally connected with the spindles C and C', preferably by means of vertically-arranged links $k^4$ and $k^5$, which are pivotally connected at their upper ends with the said levers, and at their lower ends pivoted to swivels or sleeves, which are fitted upon the spindles, so as to permit the axial rotation of the said spindles independently of the levers.

The blanks to be tapped in the machine may be supported in position to be operated upon by the taps $C^2$, which are connected to the lower ends of the tap-spindles C and C' by any suitable holding device constructed to permit the nut-blanks to move with the spindles. The holders may, for instance, be mounted upon an independent revolving part actuated from the reel, or moved by the engagement of the moving taps with the nut-blanks; or, as herein shown, the holders may be rigidly attached to and move with the reel. In the construction of the parts mentioned, illustrated in the accompanying drawings, the nut-blanks are held at their edges between guide-plates M, which are supported on an annular casting, N, connected with the reel-frame by means of posts $B^4$, so as to rotate therewith. The casting N is preferably provided with an annular recess or receptacle, N', located beneath the several blank-holders and intended to receive the oil or lubricant which drips from the taps in the operation of the machine.

The plates M are preferably provided upon their inner or adjacent faces with vertical depending portions $m$, which form the nut-holders proper, and between which the nut-blanks are placed and by which they are held from rotation, said portions $m$ being provided at their lower edges with inwardly-projecting flanges $m'$, upon which the nut-blanks rest and by means of which they are supported at either side of the grooves formed by the said guide-plates M. Upper guides for the top of the blanks are formed by means of separate pieces or plates M', bolted upon the upper surfaces of the plates M, and having down-turned ends $m^2$, which overlap the vertical face of the part $m$, and the lower edges of which come in contact with the upper surfaces of the blanks and operate in connection with the flanges $m'$ to prevent vertical movement in said blanks under the action of the taps thereon, as shown more clearly in Fig. 6.

In order to provide for variation in the thickness of the nut-blanks to be operated upon in the machine, the plate M' may be adjusted vertically, so as to bring the edge of the projection $m^2$ nearer to or farther from the flange $m'$ by inserting plates of different thickness between the plate M' and the plate M. Any other means of adjustment may, however, be used in connection with the plate M' for the purpose stated.

The plates M are, as herein shown, secured to the casting N by means of bolts $M^2$ and $M^3$, inserted through said plates and the said casting. For the purpose of adjusting the plates M laterally so as to increase or decrease the space between the vertical faces of the depending portions $m$, and to thereby provide for the insertion of nuts of different sizes in the machine, the bolts $M^2$ and $M^3$ are inserted through transverse slots $m^3$ and $m^4$ at the front and rear end of the said plates, respectively. In order, however, to provide space in the machine shown for the inner ends of the several plates at the central portion of the casting N, the adjacent outer corners of the plates M at their inner ends are cut away so as to leave the slots $m^4$ open at one end.

As shown in Figs. 5 and 6, the casting N is made flat upon its upper surface inside and outside of the recess or receptacle N', in order to afford a plane bearing-surface upon which the plates M are bolted, and the upper surface of said casting in its portions adjacent to and between the outer ends of the plates M is formed with inclined surfaces $n$, as shown more clearly in Fig. 2, so as to afford a guide for the nut-blanks when they are being inserted between said plates. The said casting N is also provided at points adjacent to the inner ends of the nut-blank guides with downward passages or openings $N^2$, through which the finished nut, when pushed rearwardly out of the holders by the insertion of a nut-blank, may fall to a receptacle beneath. The rear portions, $m^5$, of the blank-supporting flanges $m'$ are preferably rearwardly and upwardly inclined, so as to guide the finished nuts upwardly over the front wall, $n^2$, of the opening $N^2$ when pushed rearwardly by the insertion of a nut-blank, as above described.

For the purpose of causing the automatic operation of the clutch-levers J', so as to effect the reversal of the direction of rotation of the several tap-spindles at desired intervals, the outer ends of the said levers are engaged with an annular stationary cam-ring, O, constructed to throw the said levers up and down, as necessary in the operation above mentioned. The cam-ring herein illustrated is constructed to change the direction of rotation twice during a complete revolution of the spindle-carrying reel, and in such a manner that the spindles will be rotated in one direction in making a half-revolution around the central axis of the reel, and will be rotated in the opposite direction during the remaining half-revolution. The changes of direction in the rotation of the spindles are made at or about the point at which the nuts are fed or placed in the guides beneath the tap-spindles and at a point diametrically opposite to such place of insertion. By this construction the backward rotation of the spindle for the purpose of withdrawing or backing out the tap from the finished nut will take place during a half-revolution of the reel, and will cause a downward movement of the opposite tap during a half-revolution, such downward movement beginning at the point at which the blanks are fed to the machine.

The cam-ring O may be provided with a cam-groove for engagement with the ends of the levers J', or may be constructed in any other well-known manner to cause the necessary vertical movement of said levers. As herein shown, the said cam-ring is made in two pieces, O' and $O^2$, divided at diametrically-opposite points, the ends of the levers being constructed to move upon the upper surface of the part O', during one-half of the revolution of the reel, so as to hold the several clutches in engagement with the gear-wheels H, and to run upon the lower edge of the part O² during the opposite half of the revolution of the reel, so as to hold the clutches in engagement with the gears I during such time, the said rings O' and O² being beveled at their meeting ends, as indicated at o o', so as to cause the ends of the levers to pass alternately from the upper surface of one to the lower surface of the other, as shown more clearly in Fig. 1 of the drawings. The levers J' are, as herein shown, and as preferably constructed, provided with friction-rollers $j^5$ upon their ends, which engage the cam-rings O' and O².

The semicircular cams O' and O² are preferably supported from the stationary casting F by means of the vertical studs or posts F', which are secured to the ends of arms $f$ upon said casting and rigidly connected at their ends with brackets P, which are bolted to the said cam-rings O' and O². The brackets P are, as herein shown, connected with the rods F' by means of eyes $p$, upon said brackets, through which the said rods pass, set-screws $p'$ being inserted through the eyes $p$ in order to hold the cam-rings firmly upon the rods and to permit their adjustment vertically when found necessary or desirable.

The gear-wheels H are preferably provided with sleeves $h'$ surrounding the spindles C and C' and extending upwardly through bearing-boxes $b$ in the disk B, and having secured upon their upper ends annular flanges or rings $h^2$, which extend outwardly over the upper edges of the bearing-boxes $b$, and serve to hold the said wheels from vertical movement.

The wheels I are preferably mounted upon sleeves $b^2$, forming upward extensions of the bearing-box $b'$ in the lower disk, B', this construction being used in order to prevent the frictional resistance which would result in case the said wheels I were mounted directly upon the spindles C and C'.

Instead of the construction described and shown in the bearings for the gear-wheels H, such wheels may be mounted upon downwardly-projecting sleeves upon the bearing-boxes $b$, similar to the sleeves $b^2$ above described in connection with the gear-wheels I, suitable means being provided in such case upon the lower end of the downwardly-projecting sleeves in order to prevent the wheels H from dropping therefrom by gravity. The construction last described presents the advantage of avoiding the friction consequent upon the rotation of the said wheels in contact with the spindles.

The levers K and K', as herein shown, and as preferably constructed, are provided with handles K² and K³, by which the said levers may be moved for the purpose of actuating the tap-spindles longitudinally in starting the machine.

In the operation of a machine constructed as above described the nut-blanks are inserted into the holders upon the casting N at the point at which the direction of rotation of the taps is changed and at which they begin to turn in a direction for entering the blanks. The point at which the nut-blanks are fed to the machine shown is at the holder shown at the center of Fig. 1. In tapping the first blank at the time of starting the machine one of the tap-spindles, as C', is thrown downwardly, so as to start the tap into the blank by moving one of the levers, as K', by hand, after which the rotation of the spindle will continue during the movement of the reel until the latter has made a half-revolution and the spindle engaged with the blank has reached the side of the machine opposite that at which the blank was introduced. At such point the action of the cam-ring O' upon the clutch device will cause the reversal of the direction of rotation of the spindle, and the tap upon the spindle will be withdrawn from or backed out of the nut with which it is engaged. The said nut being held from vertical movement the action of the lever K' connecting the said spindle with the other spindle, as C', diametrically opposite to it will throw the tap upon the latter downwardly and cause it to enter another blank placed in the holder beneath it. The second pair of spindles, as C', is started in a similar manner. It is obvious from the above that after the first blank has been cut by one spindle of each pair of spindles C and C' the necessary vertical movement of the taps in entering the blanks will be accomplished in the manner set forth, and the machine will continue to operate automatically as long as blanks are fed regularly to it.

Any desired number of pairs of spindles may obviously be used in a reel-machine of the character described, the operation of such spindles being precisely the same as in the construction shown.

I claim as my invention—

1. The combination of two or more rotary and longitudinally-movable tap-spindles, a revolving frame or reel having bearings for said spindles, holders for supporting two or more nut-blanks in position to be operated upon by the taps, connections between the opposite spindles constructed to produce from a longitudinal movement of one spindle a longitudinal movement of the other spindle, means constructed to rotate the tap-spindles alternately in opposite directions, and means for simultaneously and intermittingly changing the direction of rotation of the opposite spindles during the rotation of the reel and at times when the spindles arrive at the terminations of their respective longitudinal movements, substantially as described.

2. The combination of two or more longitudinally-movable tap-spindles, a revolving frame or reel having bearings for said spindles, revolving supports for two or more nut-blanks, means connecting the opposite spindles constructed to produce from a longitudinal movement of one spindle a longitudinal movement of the other spindle, wheels mounted concentric with the several spindles, driving-gear to rotate said wheels in opposite directions, suitable clutch devices upon the several spindles to connect said spindles alternately with the said wheels, levers for operating said clutches, and a stationary cam-ring for intermittingly actuating the levers during the rotation of the reel, substantially as and for the purpose set forth.

3. The combination, with holders for supporting two nut-blanks, of two rotary and longitudinally-movable tap-spindles, means constructed to rotate said spindles alternately in opposite directions, and a centrally-pivoted lever connected at its ends with the said tap-spindles, substantially as and for the purpose set forth.

4. The combination, with two or more rotary and longitudinally-movable tap-spindles, of a revolving reel affording bearings for said spindles, means for supporting two or more nut-blanks upon the said reel, means constructed to rotate the tap-spindles alternately in opposite directions, a centrally-pivoted lever or levers connected with the opposite tap-spindles for imparting from the longitudinal movement of one spindle an equal longitudinal movement to the other spindle, and a support for the pivotal point of the lever or levers applied to rotate with the reel, substantially as and for the purpose set forth.

5. The combination of a series of rotary and longitudinally-movable tap-spindles, means for rotating said spindles alternately in opposite directions, a revolving reel carrying the said spindles and constructed to support a series of nut-blanks, a stationary vertical shaft axially supporting said reel, a plate, L', bolted to the upper end of the reel and extending over the end of the said axial shaft, a post, L, upon said plate, and levers K K', centrally pivoted to said post and connected at their ends with the tap-spindles, substantially as and for the purpose set forth.

6. The combination, with the reel having two vertically-separated parts, B and B', a series of longitudinally-movable tap-spindles mounted rotatably in said reel, an axial shaft, A³, supporting said reel, a sleeve, D, surrounding said shaft, means for revolving said sleeve upon the shaft, wheels H and I, mounted, respectively, upon the parts B and B' concentric with the tap-spindles, means for actuating the said wheels H and I from the said sleeve constructed to cause their rotation in opposite directions, movable clutches upon the said spindles between the wheels H and I constructed to alternately connect said wheels with the spindles, and means for actuating said clutches, substantially as described.

7. The combination, with a reel, two or more rotary and longitudinally-movable tap-spindles mounted in said reel, and means for rotating the spindles, of an annular casting, N, rigidly connected with the reel, and adjustable plates M, secured to said casting and constructed to support the nut-blanks, substantially as described.

8. The combination, with a reel, two or more rotary and longitudinally-movable tap-spindles mounted therein, and means for rotating the spindles, of an annular casting, N, rigidly connected with the reel, plates M, for holding nut-blanks provided with horizontal flanges $m'$, and adjustable plates M', secured to said plates M, substantially as and for the purpose set forth.

9. The combination, with a rotary and longitudinally-movable tap-spindle and means for rotating the spindle, of a casting, N, provided with holders for the nut-blanks, and a vertical aperture, N², located at the rear of the nut-holders and constructed to permit the escape of the finished nuts when the latter are displaced by the insertion of a nut-blank in the holders, substantially as described.

10. The combination, with a rotary and longitudinally-movable tap-spindle and means for rotating the spindle, of a casting, N, provided with a recess, N', and an aperture, N², plates M, attached to the said casting and provided with vertical portions $m$, having horizontal flanges $m'$ and inclined flanges $m^5$, and adjustable plates M', secured to said plates M and having horizontal bearing-surfaces opposed to the flanges $m'$, substantially as and for the purpose set forth.

In testimony that I claim the foregoing as my invention I affix my signature in presence of two witnesses.

CHRISTOPHER G. CROSS.

Witnesses:
 M. E. DAYTON,
 JESSE COX, Jr.